United States Patent [19]

Silverman et al.

[11] 3,915,008
[45] Oct. 28, 1975

[54] GAUGE MOUNTING

[75] Inventors: Albert A. Silverman, Wauwatosa; Erich J. Kocher, Milwaukee, both of Wis.

[73] Assignee: Vilter Manufacturing Corporation, Milwaukee, Wis.

[22] Filed: July 26, 1974

[21] Appl. No.: 492,017

[52] U.S. Cl. .................................... 73/392; 73/420
[51] Int. Cl.² ............................................ G01L 7/00
[58] Field of Search ............. 73/392, 420, 414, 411, 73/418, 391

[56] References Cited
UNITED STATES PATENTS

| | | | |
|---|---|---|---|
| 1,941,613 | 1/1934 | McDonell | 73/392 |
| 2,486,133 | 10/1949 | Egger | 73/392 |
| 2,515,394 | 7/1950 | Clarkson | 73/392 |
| 2,618,978 | 11/1952 | Ragland | 73/420 |
| 2,897,675 | 8/1959 | Kocher et al. | 73/392 |

*Primary Examiner*—Donald O. Woodiel
*Attorney, Agent, or Firm*—James E. Nilles

[57] ABSTRACT

A mounting for a pressure indicating gauge in which gas pressure pulsations from a source of gas pressure are absorbed by a helical tubular spring conveying the pressurized gas serially to a chamber at one side of a diffusion plate through which the gases are delivered to break up into separate pressure waves. The gases enter a cavity at the opposite side of the diffusion plate and pass to the gauge which mechanically moves an indicator which is further dampened to avoid residual pressure pulsations. The mounting serves also to absorb vibrations which cause erratic oscillation of the gauge indicating pointer and also serves to isolate the gauge from shocks. The mounting further includes a soft, rubber-like sleeve which engages the outer surfaces of the tubular spring to dampen its vertical movement and prevent swaying of the gauge relative to the structure on which it is mounted. The gauge mounting further includes a ballast member to lower the center of gravity of the suspended mass and may employ an auxiliary spring to support heavier gauges.

14 Claims, 1 Drawing Figure

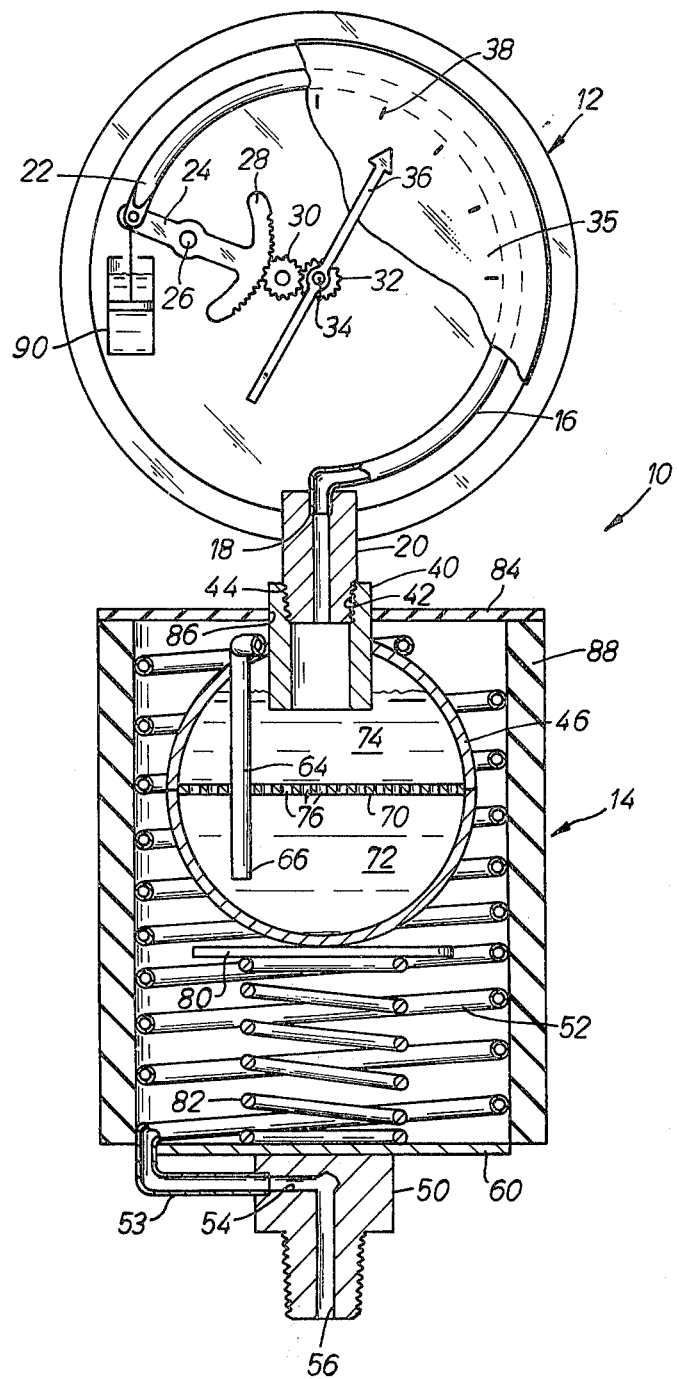

GAUGE MOUNTING

BACKGROUND OF THE INVENTION

This invention relates to pressure gauges and, more particularly, to mountings for pressure gauges which isolate the gauge from pressure pulsations and vibration.

Gauges which are employed to measure and indicate pressure of fluids are frequently subjected to pressure pulsations of the media to be measured or are subjected to vibrations or shock transmitted to the gauge from the supporting structure on which the gauge may be mounted. Such pulsations, vibrations and shocks subject the indicator of the gauge to oscillations through a relatively wide range, making it difficult to obtain accurate pressure readings and in some cases cause damage or shorten the useful life of the gauge.

Pressure measuring gauges are available in a large variety of sizes and weights and, as a consequence, various mountings for such a range of gauges must be provided or the gauge mountings must be sufficiently flexible to accommodate the wide range of sizes.

An example of gauge mounting for dampening vibration and pressure pulsations is disclosed in U.S. Pat. No. 2,897,675 and the gauge mounting embodying the present invention is an improvement over such mountings.

SUMMARY OF THE INVENTION

The present invention contemplates a gauge mounting in which a gauge can be supported relative to a structure which is subject to vibrations and in which the pressure media to be measured may be subject to pressure fluctuations and pulsations, the mounting being such that the gauge is isolated from the pulsations and vibrations. The mounting serves to direct the fluid media, the pressure of which is to be measured and indicated, serially through a path which successively dampens the pressure waves and pulsations and at the same time the structure serves to suspend the gauge in a manner which dampens vibrations and shock loads which otherwise might be transmitted to the gauge.

The gauge mounting employs a helical tubular spring which serves to support a gauge and at the same time to convey the pressure media from the presssure source to the gauge. The pressure stream is communicated serially through the tubular spring to a chamber where the stream is permitted to enlarge and pass through a plate where the pressure waves are broken up into a multiplicity of streams which are diffused in another enlarged cavity before being communicated with the gauge. Residual vibrations and pressure pulsations are further dampened by a dashpot. The mounting also employs a flexible sleeve which surrounds the supporting tubular spring and serves to dampen its vertical deflections and to stabilize the sprung mass which includes the gauge, relative to the unsprung portion of the mounting. The mounting also employs a ballast member which acts to lower the center of gravity of the sprung mass and to stabilize the latter and makes it possible to use a single size mounting for supporting light gauges which otherwise would not be heavy enough to deflect the tubular spring. An auxiliary support spring may be used to accommodate gauges of larger sizes.

BRIEF DESCRIPTION OF THE DRAWING

The FIGURE of the drawing is a sectional elevation of a pressure gauge and gauge mounting with the section taken centrally and vertically through the major portion of the mounting assembly.

DETAILED DESCRIPTION

Referring to the FIGURE of the drawing, a gauge and mounting assembly embodying the invention is indicated generally at 10 and includes a pressure indicating gauge 12 which is supported by a gauge mounting assembly 14.

The gauge 12 is of the Bourdon tube type in which a flexible, metallic tube 16 of elliptical cross section is formed in a circular arc with an open end portion 18 fixed as by soldering to a gauge inlet fitting 20. An application of pressure to the gauge inlet fitting 20 to the tube 16 tends to straighten the latter so that a free end portion 22 moves to transmit the motion to a lever 24 pivoted at 26. The lever 24 is provided with a gear sector 28 in mesh with a pinion 30 which, in turn, is in mesh with a gear 32 fixed to a spindle 34. The spindle 34 projects through the face 35 of the gauge and supports an indicator or pointer 36 which is mounted on the spindle 34 to rotate therewith. Changes of pressure in the tube 16 result in movement of the pointer 36 relative to graduated indicia 38 on the face of the gauge. Precise and accurate readings require that the gauge 12 be protected from vibrations and from pressure pulsations.

The gauge 12 is supported by means of the mounting assembly 14 relative to structure such as a tank or other equipment (not shown) which is the source of the pressure to be measured and which often is subject to vibration. The mounting assembly 14 includes an upper support member 40 which is generally tubular and has an upper portion internally threaded at 42 to receive complementary external threads 44 on the gauge inlet fitting 20. The upper support member 40 is secured in pressure tight relationship with chamber 46 as by soldering so that the interior of the chamber communicates through the tubular support member 40 and the gauge inlet fitting 20 with the Bourdon tube 16.

The upper support member 40 and the chamber 46 are supported in vertically spaced relationship to a lower support member 50 by means of a tubular, helical spring 52. The helical spring 52 has a radially extending lower end portion 53 which is secured in fixed relationship to the lower mounting member 50 as by soldering so that the interior of the helical tube 52 communicates with a radial passage 54 formed in the lower mounting member 50. The radial passage 54, in turn, communicates with an axial passage 56. The lower end of the mounting member 50 is provided with external threads to be received in a valve or fitting (not shown) but associated with structure such as a tank which supplies the source of pressure to be measured.

The lower mounting member 50 includes a circular plate 60 which is fixed to an upper portion of the mounting member 50. A portion of the tubular spring 52 may be secured near the periphery of the plate 60 as by soldering to rigidly support the end portion 53 relative to member 50.

An upper end of the helical, tubular spring 52 extends downwardly to form a vertical portion 64 which passes through a wall of the chamber 46 and is secured thereto in fixed and fluid-tight relationship. The lower end 66 of the vertical portion 64 is open and is disposed in spaced relationship to a lower, inner wall portion of the chamber 46.

The chamber 46 is divided by horizontally disposed diffusion plate 70 which is secured within the chamber 46 to divide it into a lower cavity 72 and an upper cavity 74. The plate 70 is provided with a plurality of apertures 76 through which the pressure media may communicate from the cavity 72 to the cavity 74. The vertical portion 64 of the tubular spring 52 passes through the diffusion plate 70 so that the open end 66 communicates with the cavity 72.

A ballast member 80 is rigidly fixed to the exterior bottom portion of the chamber 46 and serves as a seat for one end of an auxiliary support spring 82. The other end of the spring 82 is seated on the lower support plate 60 in axial alignment with the passage 56 in the support member 50. The auxiliary spring 82 is employed when heavy gauges are used to assist the helical tubular spring 52 in supporting the gauge. When light gauges are used the ballast member 80 serves to partially deflect the helical spring 52 so that it is more effective in reducing transmission of vibration from the lower support member 50 to the upper support member 40. In addition, the ballast member 80 serves to lower the center of gravity of the sprung mass which includes not only the gauge 12 and the chamber 46 so that the gauge tends to be more stable.

The upper mounting member 40 supports a disc 84 which is formed of a relatively hard rubber-like material having an opening 86 slightly smaller than the outer dimension of the support member 40. The opening 86 forms an interference fit with the member 40 to support the disc 84 in a general horizontal position. A cylinder sleeve 88 of sponge-like rubber or elastomeric flexible foam material is disposed coaxially over the helical tubular spring 52 so that the internal surfaces of the cylinder 88 snugly engage the outer surfaces of the coils of the helical spring 52. The upper peripheral edge of the cylindrical sleeve member 88 is cemented to the circumference of the underside of the disc 84 and the lower peripheral edge is disposed in close proximity to the circumferential edge of the plate 60. The cylindrical member serves to retard swaying of gauge 12 relative to the fixed lower mounting member 50 and also serves to dampen vertical movement of the upper mounting member 40 relative to the lower mounting member 50.

The various components of the mounting assembly 14 are so disposed that the mounting members 40 and 50, the chamber 46, the ballast member 80 and the auxiliary spring 82 are axially aligned and are disposed within the coils of the helical spring 52. Also, the entire structure between the mounting members 40 and 50 is enclosed within the cylindrical structure 88 which is closed at its upper end by the disc member 84 and is substantially closed at its lower end by the plate 60.

In operation, fluid pressure transmitted to the lower mounting member 50 from a source of pressure media is transmitted through the helical tubular spring 52. The capillary action of the tube serves to dampen pressure pulsations of the media being transmitted through the tubular member 52. The dampened pressure passing through the tube 52 is established in the lower cavity 72 in the chamber 46. The lower cavity 72, together with the upper cavity 74, serves to increase the capacity of the fluid pressure path to the gauge and to further absorb pulsating pressure waves. The diffusion plate 70 divides the enlarged main pulsating stream of gas into a plurality of smaller streams to break up the pressure waves and to diffuse them in the upper cavity 74. The pressure from the upper cavity is communicated through the gauge fitting 20 to the Bourdon tube 16. It will be noted that pressure waves must pass serially through the helical spring 52, the lower cavity 72, the diffusion plate 70 and the upper cavity 74 to the gauge 12. Any residual pressure waves which may remain are further dampened by a dashpot indicated at 90 which is fastended to the moving end of the Bourdon tube 16 and which is filled with a viscous fluid such as ethylene glycol. Dampening the movement of the Bourdon tube serves to eliminate any residual pressure pulsations or vibrations which may be transmitted to the gauge 12.

Vibrations from the equipment on which the gauge 12 is mounted are isolated from the gauge 12 by the helical tubular spring 52 which serves to absorb the majority of the vibrations. When heavy gauges are used with the mounting assembly 14 the auxiliary spring 82 may be employed to assist in supporting the sprung mass which includes the gauge 12 and the chamber 46. However, when lighter gauges are employed the spring 82 may be eliminated.

The cylinder of soft sponge-like material 88 resists swaying movement of the gauge 12 relative to the lower mounting member 50 and also serves to engage the outer surfaces of the coils of the spring 52 to dampen any vertical movement of vertical oscillations of the upper and lower mounting members relative to each other.

A gauge support has been provided in which a gauge may be mounted relative to equipment supplying pressure and may be isolated from vibration and shock which otherwise might be transmitted to the gauge by means of a tubular spring the motion of which is dampened by a sleeve of rubber-like material. Further accuracy of the gauge is insured by an arrangement which absorbs pressure pulsations by directing the pressure waves through a hollow helical spring, an enlarged cavity, a diffusion plate and another enlarged cavity which all act in series to progressively dampen and eliminate the pressure waves insuring greater accuracy and longer life to the gauge. A wide range of gauge sizes and weights can be accommodated by the gauge support. For heavy gauges an auxiliary spring is used to assist the tubular spring and for lighter gauges, the auxiliary spring may be omitted so that a ballast member functions to assist the light gauge in deflecting the tubular, pressure conveying spring to make it more effective in dampening vibrations.

We claim:

1. A gauge mounting including a fluid pressure path and comprising: a first mounting member adapted to receive a pressure measuring gauge and having a passage communicating fluid pressure to the latter, a second mounting member having a passage adapted to communicate with a source of fluid pressure, a chamber communicating with said first mounting member, a diffuser plate dividing said chamber into a pair of cavitites, said chamber having a volume substantially greater than the respective volumes defined by said passages, said plate forming a plurality of fluid pressure transmitting passages, a helical resilient tube providing a fluid conduit between said second mounting member and one of said cavities and resiliently supporting said first mounting member and said chamber relative to said second mounting member, and means communicating the other of said cavities with said first mounting member for communication of said second mounting member serially through said helical tube to one of said cavities, through said pressure transmitting passages to the other of said cavities and to said first mounting member, said chamber increasing the capacity of the fluid pressure path to the gauge to absorb pressure pulsating waves and said diffuser plate breaking up the fluid pressure waves inherent in the fluid into a multiplicity of streams thereby reducing vibrations and pressure pulsations communicated to the pressure measuring gauge.

2. The combination of claim 1 in which said first mounting member is disposed vertically above said second mounting member and in which said chamber is disposed therebetween.

3. The combination of claim 2 plus additional spring means between said chamber and said second mounting member.

4. The combination of claim 1 in which said chamber is disposed within the confines of said helical resilient tube.

5. A gauge mounting including a fluid pressure path and comprising: a first mounting member having a fluid passage therein and adapted to support a gauge and communicate fluid pressure thereto, a second mounting member having a passage adapted to communicate with the source of fluid pressure, a chamber communicating with said first mounting member, a diffuser plate dividing said chamber into a pair of cavities, said chamber having a volume substantially greater than the respective volumes defined by said passages, said plate forming a plurality of fluid pressure transmitting passages, means communicating said second mounting member with one of said cavities, means communicating said first mounting member with the other of said cavities, and spring means supporting said first mounting member and said chamber relative to said second mounting member during transmission of pressure serially through said second mounting member, through one of said pair of cavities, through said passage in said plate and through the other cavity of said pair of cavities to said first mounting member, said chamber increasing the capacity of the fluid pressure path to the gauge to absorb pressure pulsating waves and said diffuser plate breaking up the fluid pressure waves inherent in the fluid into a multiplicity of streams thereby reducing vibrations and pressure pulsations communicated to the pressure measuring gauge.

6. The gauge mounting of claim 5 in which said means communicating said second mounting member with one of said cavities is a helical spring having tubular coils.

7. The gauge mounting of claim 6 in which said helical spring is disposed between said first mounting member and said second mounting member to resiliently support said mounting members in spaced relation to each other.

8. A gauge mounting comprising: a first mounting member adapted to receive a pressure measuring gauge communicating fluid pressure to the latter, a second mounting member having a passage adapted to communicate with a source of fluid pressure, a chamber supported on and connected in fluid pressure communication with said first mounting member, a plate dividing said chamber into a pair of cavities, said plate forming a plurality of fluid transmitting passages, a helical resilient tube providing a fluid conduit between said passage in said second mounting member and one of said cavities, the other of said cavities being in fluid communication with said first mounting member for communication of said second mounting members serially through said helical tube to one of said cavities, through said pressure transmitting passages to the other of said cavities and to said first mounting member, said helical tube resiliently supporting said first mounting member and said chamber relative to said second mounting member, and a cylindrical member of resilient rubber-like material supported by said first mounting member and being disposed around the outer periphery of said helical tube and in engagement with the coils of the latter, said chamber being disposed within the confines of said helical tube.

9. A gauge mounting comprising: a first mounting member adapted to support and communicate with a pressure measuring gauge, a second mounting member having a passage adapted to communicate with a source of fluid pressure, a helical resilient tube supporting said first mounting member in vertically spaced relation to said second mounting member, a cylindrical member of resilient, rubber-like material supported by said first mounting member and being disposed around the outer periphery of said helical tube and in engagement with the coils of the latter, a chamber supported on said first mounting member within said cylindrical member, a plate forming a plurality of fluid transmitting passages therethrough disposed in said chamber and dividing the latter into a pair of cavities, said helical resilient tube providing a fluid conduit between said passage in said second mounting member and one of said cavities, and the other of said cavities being in fluid communication with said first mounting member for fluid communication of said second mounting member serially through said helical tube to said one of said cavities, through said pressure transmitting passages in said plate to the other of said cavities.

10. The gauge mounting of claim 9 in which a ballast member is disposed within said cylindrical member and connected to the bottom of said chamber to partially deflect said helical tube.

11. A combination of claim 10 in which auxiliary spring means are disposed between said second mounting member and said ballast member for assisting said helical resilient tube supporting said first and second mounting members in spaced relationship to each other.

12. A gauge mounting comprising: a first mounting member adapted to receive a pressure measuring gauge and communicating fluid pressure to the latter, a second mounting member having a passage adapted to communicate with a source of fluid pressure, a chamber communicating with said first mounting member, a plate dividing said chamber into a pair of cavities, said plate forming a plurality of fluid pressure transmitting passages, a helical resilient tube providing a fluid conduit between said mounting member and one of said cavities and resiliently supporting said first mounting member and said chamber relative to said second mounting member, means communicating the other of said cavities with said first mounting member for communication of said second mounting member serially through said helical tube to one of said cavities, through said pressure transmitting passages to the other of said cavities and to said first mounting member, said first mounting member being disposed vertically above said second mounting member and said chamber is disposed therebetween, and a ballast member connected to the lower side of said chamber to partially deflect said helical tube in the absence of fluid pressure in the latter.

13. A gauge mounting comprising: a first mounting member adapted to receive a pressure measuring gauge and communicating fluid pressure to the latter, a second mounting member having a passage adapted to communicate with a source of fluid pressure, a chamber communicating with said first mounting member, a plate dividing said chamber into a pair of cavities, said plate forming a plurality of fluid pressure transmitting passages, a helical resilient tube providing a fluid conduit between said second mounting member and one of said cavities and resiliently supporting said first mounting member and said chamber relative to said second mounting member, means communicating the other of said cavities with said first mounting member for communication of said second mounting member serially through said helical tube to one of said cavities, through said pressure transmitting passages to the other of said cavities and to said first mounting member, and a cylindrical member of resilient, rubber-like material disposed around the outer periphery of said helical tube and in engagement with coils of the latter, said cylindrical member being connected to said first mounting member.

14. A gauge mounting comprising: a first mounting member adapted to support a gauge and communicate fluid pressure thereto, a second mounting member having a passage adapted to communicate with the source of fluid pressure, a chamber communicating with said first mounting member, a plate dividing said chamber into a pair of cavities, said plate forming a plurality of fluid pressure transmitting passages, means communicating said second mounting member with one of said cavities, means communicating said first mounting member with the other of said cavities, spring means supporting said first mounting member and said chamber relative to said second mounting member during transmission of pressure serially(1) through said second mounting member, (2) through one of said pair of cavities, and (3) through said passages in said plate and through the other cavity of said pair of cavities to said first mounting member, said means communicating said second mounting member with one of said cavities being a helical spring having tubular coils, and a cylindrical member of resilient material disposed coaxially of said spring and in engagement with the outer surface of the latter to dampen displacement of said mounting members relative to each other.

* * * * *